United States Patent
Nakamura et al.

(10) Patent No.: US 6,428,711 B1
(45) Date of Patent: Aug. 6, 2002

(54) PURIFICATION METHOD BY MIXING/DIFFUSION OF CLOSED WATER ZONE AND MIXING/DIFFUSION APPARATUS

(75) Inventors: Makoto Nakamura, Kanagawa-ken; Katsuya Kobayashi, Chiba-ken, both of (JP)

(73) Assignees: Tokyo Kyuei Co., Ltd; Hitachi Metals, Ltd, both of Tokyo (JP)

( * ) Notice: Subject to any disclaimer, the term of this patent is extended or adjusted under 35 U.S.C. 154(b) by 0 days.

(21) Appl. No.: 09/214,590

(22) PCT Filed: Jul. 10, 1997

(86) PCT No.: PCT/JP97/02399
§ 371 (c)(1),
(2), (4) Date: Sep. 23, 1999

(87) PCT Pub. No.: WO98/02385
PCT Pub. Date: Jan. 22, 1998

(30) Foreign Application Priority Data

Jul. 11, 1996 (JP) .............................. 8-181963

(51) Int. Cl.⁷ .................................................. C02F 1/00
(52) U.S. Cl. .................. 210/747; 366/264; 366/270
(58) Field of Search ................... 210/747, 758, 210/765; 261/120, DIG. 75; 366/262, 264, 270

(56) References Cited

U.S. PATENT DOCUMENTS

| | | | | |
|---|---|---|---|---|
| 1,762,950 A | * | 6/1930 | Beers | 366/270 |
| 1,976,955 A | * | 10/1934 | MacLean | 366/264 |
| 2,541,221 A | * | 2/1951 | Edwards | 366/264 |
| 3,973,759 A | * | 8/1976 | Mizrahi et al. | 366/264 |
| 4,030,859 A | * | 6/1977 | Henegar | 261/120 |
| 4,039,439 A | * | 8/1977 | Clark | 210/170 |
| 4,378,165 A | * | 3/1983 | Landberg | 366/270 |
| 4,724,086 A | * | 2/1988 | Kortmann | 210/747 |
| 4,780,217 A | | 10/1988 | Petersen | 210/758 |

FOREIGN PATENT DOCUMENTS

| | | |
|---|---|---|
| JP | 3-109997 | 5/1991 |
| JP | 5-309395 | 11/1993 |
| JP | 7-136637 | 5/1995 |

* cited by examiner

*Primary Examiner*—Robert Popovics
(74) *Attorney, Agent, or Firm*—Finnegan, Henderson, Farabow, Garrett, & Dunner, L.L.P.

(57) ABSTRACT

A purification method by mixing and diffusion of a closed water area comprises the steps of sucking bottom layer water and surface layer water, preparing a mixed water by mixing them before discharging, and discharging the mixed water into a water layer having substantially the same temperature as that of the mixed water to form and diffuse a density current of the mixed water. Therefore, convection currents in a vertical direction can be prevented, and the mixed water can be quickly diffused across a broad range of the closed water zone.

5 Claims, 8 Drawing Sheets

PURIFICATION METHOD BY MIXING/DIFFUSION OF CLOSED WATER ZONE AND MIXING/DIFFUSION APPARATUS

FIELD OF THE INVENTION

The present invention relates to a purification method of a closed water area in a bay, a lake, a marsh, a dam lake, etc., in which water is dead and less movable, and to an apparatus for use in the purification.

BACKGROUND OF THE INVENTION

In a closed water area in a bay, a sea water culture has been carried out for a long time. Since the water in a bay is less exchangeable with a water of open sea, the water in a bay is polluted due to self-contamination. Also, in a lake, a marsh and a dam lake, the water is polluted due to inflow and accumulation of domestic waste water. Since the water in a closed water area is less exchangeable as mentioned above, the water is thermally stratified most of a year as shown in FIG. 4. The stratification of the water in a closed water area occurs due to a density gradient between a surface layer water, a middle layer water and a bottom layer water. The density gradient is caused by a decrease in the density of the surface layer water due to a heat of solar radiation and a temperature difference between the water and air contacting the water surface. The thermal stratification of FIG. 4 consists of, from the bottom, a bottom layer 52 having a low temperature and a high density, a thermocline layer 53 thereon in which the temperature abruptly changes, and a surface layer 54 having a high temperature and a low density. In addition to the stratification due to the temperature difference, a stratification due to a difference in dissolved oxygen (DO) contents may occur.

The atmospheric temperature and the sunshine intensity changes daily and annually, and the water is stratified depending on the daily change and annual change. In FIG. 4, a dashed curve 41 shows a temperature distribution of a surface layer water in the daytime, and a curve 42 shows a temperature distribution in the night. The temperature distribution in the night is nearly the same as a temperature distribution caused by the annual differences in sunshine intensity and the atmospheric temperature. In the temperature distribution curve 42, the portion 53 in which the temperature changes abruptly is referred to as a primary thermocline layer. A surface layer 54 referred to as a secondary thermocline layer has a higher temperature which changes abruptly, and occurs due to the daily differences in sunshine intensity and the atmospheric temperature.

Since the bottom layer water has a low temperature and the sunlight does not reach the bottom layer, the photosynthesis by phytoplanktons does not take place there and oxygen is not released to the bottom layer. Also, since the stratification prevents the convection of the water, the dissolved oxygen (DO) in the surface layer is not transferred to the bottom layer. Therefore, the bottom layer water forms an oxygen-deficient water mass having a DO content of nearly zero.

Contrary to the bottom layer, since the surface layer has a higher temperature and receives a sufficient amount of sunshine, the photosynthesis by phytoplanktons vigorously occurs therein and oxygen in the air contacting the water surface is also dissolved into the surface layer water, the DO content of the surface layer water reaches 8–10 ppm, in some cases, reaches a supersaturated amount of about 30 ppm.

In the stratifying phase (summer season in which a large temperature difference is created between the surface layer, the middle layer and the bottom layer), the oxygen-deficient water mass on the mud of the sea-bottom or lake-bottom becomes a density current (thin laminar flow) and flows into a recessed or depressed portion of the sea-bottom or lake-bottom and accumulated there. In the recessed portion, organic substances such as dead bodies of phytoplanktons are sedimented and accumulated to form the mud. In the oxygen-deficient water mass having a low DO concentration, anaerobic bacteria actively produce from the mud nutritive salts of organic acids, ammonia, phosphoric acid, etc. and poisonous gases such as hydrogen sulfide to make the oxygen-deficient water mass more eutrophic.

In late summer or autumn (from September to October in Japan) in which the atmospheric temperature sometimes becomes lower than the water temperature, the thermal stratification of the closed water area is gradually disappeared to enter upon a circulating phase. At be beginning of the circulating phase, the oxygen-deficient water mass in the bottom layer occasionally rises near the surface layer by some external causes such as a transitory wind to kill the cultured fishes, etc. in a short time. Also, since the oxygen-deficient water mass is rich in the nutritive salts, the oxygen-deficient water mass rising into the surface layer receiving a strong sunlight causes an explosive growth of phytoplanktons such as water bloom, thereby preventing the good use of the water.

The temperature distributions in the depth direction of the same closed water area (Ohfunato Bay in Iwate-ken, Japan) are shown in FIG. 5A for the stratifying phase in summer (August) and in FIG. 5B for the circulating phase in late autumn (November). FIGS. 6A and 6B schematically show the distribution of the dissolved oxygen concentration in the water depth direction of the same closed water area in the same season as in FIGS. 5A and 5B. In summer, both the water temperature and the dissolved oxygen concentration change consecutively from the surface layer to the deep layer to form a stable stratification. However, in late autumn, the stratification is disappeared and the distributions of the water temperature and the dissolved oxygen concentration become unclear. In summer in which the closed water is thermally stratified, the oxygen-deficient water mass having a DO concentration of 4 ppm (mg/liter) is likely to be formed particularly in a recessed portion of the sea-bottom and lake-bottom.

To avoid the damage due to the rise of the oxygen-deficient water mass into the surface layer, proposed is a method for disappearing the oxygen-deficient water mass in the bottom layer, in which the bottom layer water containing the oxygen-deficient water mass is pumped up and discharged into the surface layer to mix the oxygen-deficient water mass with the surface layer water to diffuse the oxygen-deficient water into the oxygen-rich water of the surface layer of the closed water area. In another method, the oxygen-deficient water mass is disappeared by discharging a sucked surface layer water into the bottom layer to mix the surface layer water and the bottom layer water.

As a means for practicing the above method, Japanese Patent Laid-Open No. 5-309395 discloses agitating aeration apparatuses shown in FIGS. 7 and 8.

The agitating aeration apparatus of FIG. 7 comprises a float 101 and a pump 102 vertically suspended from the float 101. The pump 102 comprises a discharge casing 103, an intake casing 104, an electric motor 105, and an impeller 106. An opening 103a of the discharge casing 103 is positioned in the surface layer water, and an opening 104a of the intake casing 104 is positioned in the bottom layer water. Upon rotating the impeller 106, the bottom layer water is sucked through the opening 104a of the intake casing 104 as shown by arrows A, A, and discharged horizontally from the opening 103a of the discharge casing 103 in the direction shown by arrows B, B.

The agitating aeration apparatus of FIG. 8 comprises a float 111 and a pump 112 vertically suspended from the float 111. The pump 112 comprises an intake casing 113, a discharge casing 114, an electric motor 115, and an impeller 116. An opening 113a of the intake casing 113 is positioned in the surface layer water, and an opening 114a of the discharge casing 114 is positioned in the bottom layer water. Upon rotating the impeller 116, the surface layer water is sucked through the opening 113a of the intake casing 113 as shown by arrows C, C, and discharged horizontally from the opening 114a of the discharge casing 114 in the direction shown by arrows D, D.

However, the known apparatus has the following disadvantages.

In the agitating aeration apparatus of FIG. 7, since the bottom layer water of low temperature is discharged into the surface layer water of high temperature, the discharged bottom layer water flows downward to cause convection currents in the vertical direction, thereby failing to be sufficiently mixed with the surface layer water. In the agitating apparatus of FIG. 8, the convection currents in the opposite direction to the above are caused. When the convection currents reach a steady state, a stable flow pattern of convection currents and a stable DO diffusion flume are formed around the agitating aeration apparatus thereby creating a DO concentration distribution in which DO is saturated in the central portion of the agitating aeration apparatus and the DO concentration decreases with increasing distance from the apparatus. Namely, the surface layer water and the bottom layer water are mixed and diffused only in a narrow portion around the agitating aeration apparatus, and as a result thereof, DO is transferred only to a limited area.

Japanese Patent Laid-Open No. 7-136637 discloses an agitating apparatus 121 as shown in FIG. 9, which comprises an upper agitator of top-sucking and side-discharging type and a lower agitator of bottom-sucking and side-discharging type. The upper agitator has a vertical cylinder 122, at the center of which a submersible electric mixer 123 equipped with a rotating impeller is disposed, and a discharging means 127 disposed below the cylinder 122 and comprising two horizontal plates 124, 125 and a projection 126 for regulating the water flow. The lower agitator has a similar construction to that of the upper agitator and is attached to the lower surface of the upper agitator with upside down. The surface layer water sucked from a top opening of the cylinder 122 is accelerated by the mixer 123 to be discharged from the discharging means 127 in the horizontal directions. Likewise, the bottom layer water sucked from a bottom opening of the cylinder 122' is accelerated by the mixer 123' to be discharged from the discharging means 127' in the horizontal directions. Thus, in the agitating apparatus of Japanese Patent Laid-Open No. 7-136637, the surface layer water of low density and high temperature is discharged from the upper discharging means 127, and the bottom layer water of high density and low temperature is discharged from the lower discharging means 127', respectively in the horizontal directions. Since the discharged surface layer water moves upward and the discharged bottom layer water moves downward due to the density difference between them to independently forms respective convection currents, the surface layer water and the bottom layer water are not sufficiently mixed and a broad horizontal diffusion of the discharged water does not occur.

Accordingly, an object of the present invention is to solve the disadvantages in the known agitating apparatus, and provide a method in which the surface layer water and the bottom layer water are efficiently mixed to each other and the mixed water is rapidly diffused over a wide range of the closed water area, and an apparatus practicing the method.

DISCLOSURE OF THE INVENTION

As described above, in the closed water area in lake, marsh, dam lake, bay, etc., the surface layer water is warmed by the heat of sunshine and the air contacting the water surface to cause the temperature gradient in the water of closed area. Therefore, the water of closed area is thermally stratified most of the year. As shown in FIG. 4, the thermal stratification comprises, from the bottom, a deep layer (bottom layer) 52 of low temperature and high density, a thermocline layer 53 thereon in which the temperature changes abruptly with respect to the depth, and a surface layer 51 of high temperature and low density. In the daytime, a secondary thermocline appears due to the difference in the sunshine intensity and the atmospheric temperature between daytime and night. Although depending on the water depth, the shape of the bottom, the atmospheric temperature, the sunshine intensity, etc., the surface layer 51 has a temperature of 18–23° C. and is formed at surface to a depth of about 4 m, the thermocline layer 53 has a temperature of 16–19° C. and is formed at a depth of about 4–6 m. The deep layer 52 is a water layer with a lower temperature formed under the thermocline layer. The secondary thermocline is formed at a depth of about 1.5–2 m and is rich in phytoplanktons and DO.

Water flowing into the closed water area moves along the bottom thereof, and when reaches a water layer with the same density, the water diffuses into the water layer in the form of a laminar current over a wide range of the closed water area. Such a diffusion is called as a density current diffusion.

The inventors have found that when a mixture of the bottom layer water forming an oxygen-deficient water mass and the surface layer water forming an oxygen-rich water mass prepared in a mixing/diffusion apparatus is discharged nearly horizontally into a specific water layer in the thermal stratification, the discharged mixed water forms a density current to diffuse rapidly over a wide range of the closed water area. The present invention has accomplished by this finding.

Thus, in a fist aspect of the present invention, there is provide a method for purifying a closed water area by mixing and diffusing, which comprises the steps of (1) sucking a surface layer water and a bottom layer water of the closed water area separately; (2) mixing the surface layer water and the bottom layer water to prepare a mixed water; and (3) discharging the mixed water into a water layer having a temperature nearly the same as that of the mixed water to form a density current of the mixed water, thereby diffusing the mixed water radially in nearly the horizontal direction through the water layer, the water layer constituting one of stratified layers of the closed water area comprising a plurality of water layers having different temperatures and different densities.

In a second aspect of the present invention, there is provided a mixing/diffusing apparatus comprising (1) an upper intake for sucking a surface layer water of a closed water area disposed in a vertically upper portion of the apparatus, (2) a lower intake for sucking a bottom layer water of the closed water area disposed in a vertically lower portion of the apparatus, (3) a sucking means for sucking at least one of the surface layer water and the bottom layer water, and (4) a mixing/discharging means for mixing and discharging the sucked surface layer water and bottom layer water disposed at a vertically intermediate portion between the upper intake and the lower intake.

BEST MODE FOR CARRYING OUT THE INVENTION

Figure 1:
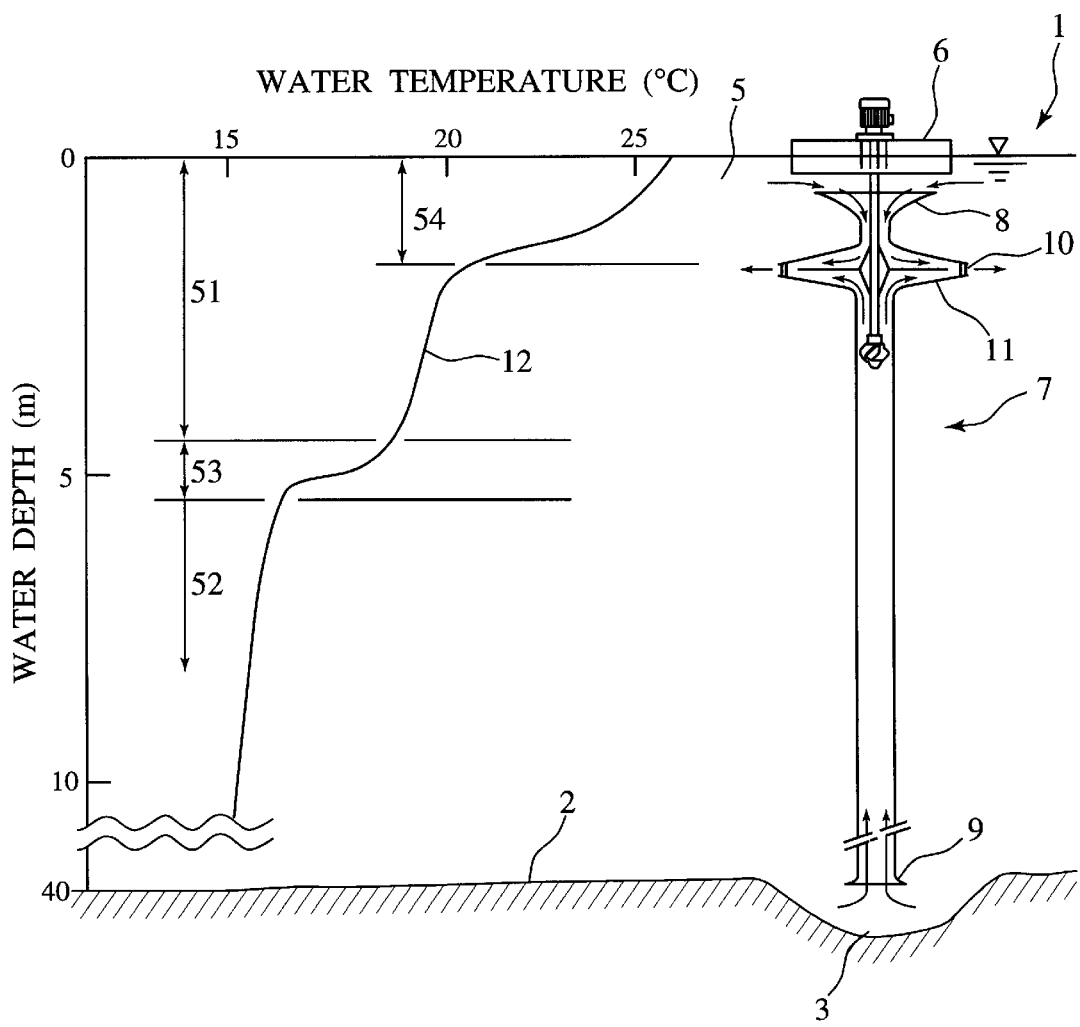
FIG. 1 is a schematic illustration showing a manner of practicing the present invention.

The present invention will be described in more detail referring to the drawings, in which like reference numerals indicate like parts.

An embodiment of practicing the present invention is schematically illustrated in FIG. 1. Reference numeral 1 shows a lake, reference numeral 2 is a lake-bottom, and reference numeral 3 is a recessed portion on the lake-bottom 2. Reference numeral 5 is a lake water being stratified into a surface layer water 51, a thermocline 53 and a bottom layer water 52. The temperature distribution of the lake water is shown by a curve 12.

The surface layer water 51 dissolves oxygen from air and photosynthesis of phytoplanktons therein to create an oxygen-rich condition having a DO concentration of 8–30 ppm. Since the sunlight hardly reaches the bottom layer water 52 and photosynthesis by phytoplanktons hardly occurs therein, the bottom layer water 52 is in an oxygen-deficient condition of a DO concentration of about 0–2 ppm. When the water is stratified, the surface layer water and the bottom layer water are not circulated. As a result thereof, the surface layer water forms an oxygen-rich water mass, and the bottom layer water stays in the bottom portion (deep portion) forming an oxygen-deficient water mass.

A mixing/diffusing apparatus 7 is vertically suspended from a float 6 floating on the surface of the stratified lake water 5 so that an upper intake 8 is positioned in the oxygen-rich surface layer water 51 and a lower intake 9 is positioned in the oxygen-deficient bottom layer water 52 while facing to a recessed portion 3. A discharge opening 10 of a mixing/discharging means 11 is adjusted so as to be positioned in a thermocline (primary thermocline) 53 at about 4–6 m deep, a water layer beneath the thermocline 53, or a water layer below a secondary thermocline 54 (daily thermocline formed by a daily change) at water surface to a depth of about 1.5–2 m. The float 6 rides at mooring ropes (not shown).

Figure 2:
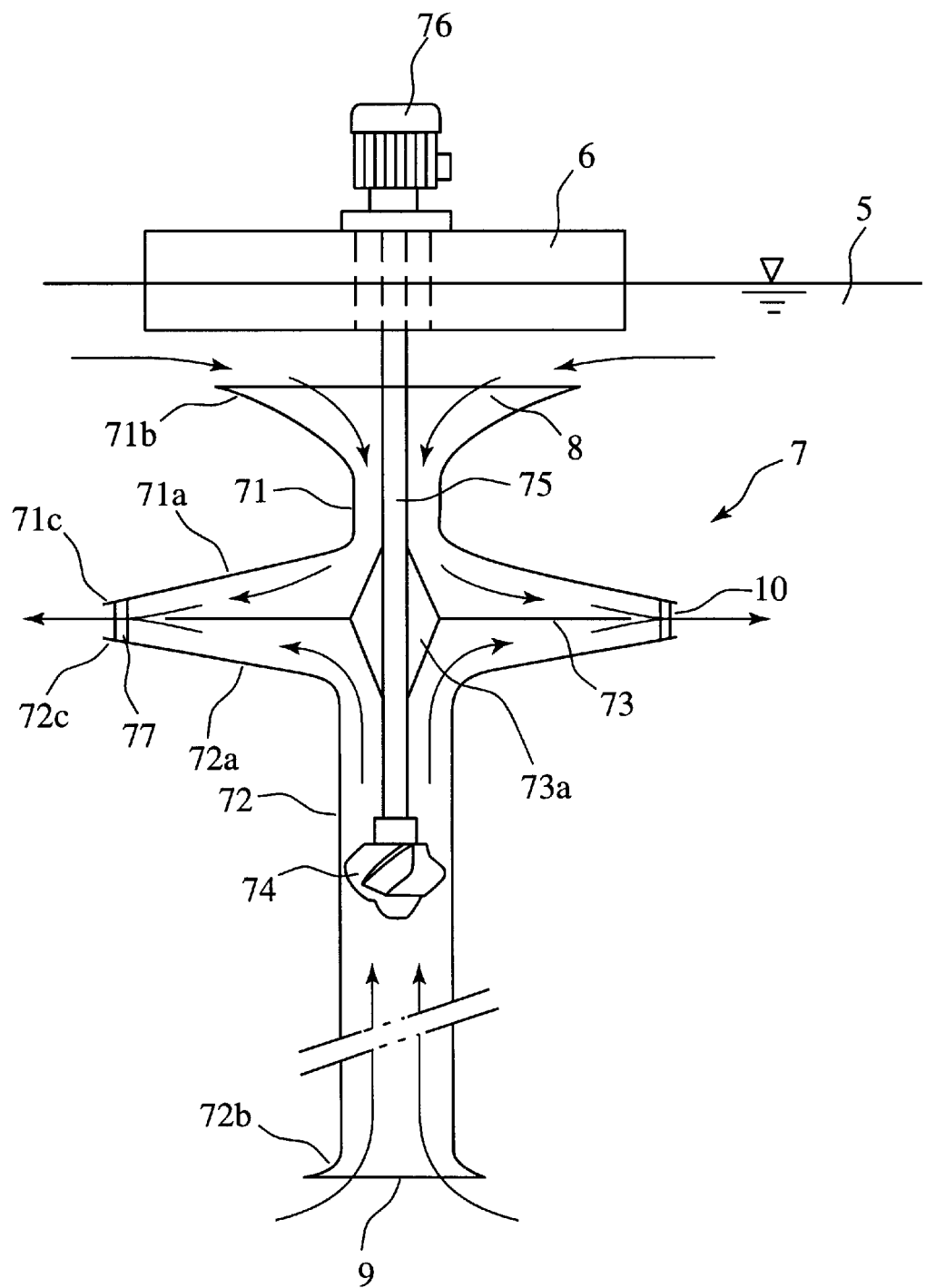
FIG. 2 is a cross sectional view showing a mixing/diffusing apparatus of the present invention.

FIG. 2 is a cross sectional view showing the mixing/diffusing apparatus 7 of the present invention. An upper end of a hollow cylindrical upper casing 71 is made into a tulip-like bell mouth 71b, an upper opening thereof forming the upper intake 8 for sucking the surface layer water into the apparatus. A conical diffuser 71a is disposed to a lower portion of the upper casing 71. An upper end of a hollow cylindrical lower casing 72 is made into a inverted conical diffuser 72a, and a lower end thereof is made into a bell mouth 72b, a lower opening thereof forming the lower intake 9 for sucking the bottom layer water into the apparatus. The diffuser 71a and the diffuser 72a face to each other so that marginal peripheries 71a and 72a define a circular discharge opening 10. A space defined by inner surface of the diffuser 71a and the diffuser 72a is divided into two axial (vertical) equal parts by a flow control disk 73 disposed horizontally. The flow control disk 73 i4 fixed to the periphery of the diffusers 71a, 72a by a plurality of fixing means 77 disposed on the flow control disk 73 along the circular periphery so as not to disturb the discharge of a mixed water. To ensure the mixing of the surface layer water and the bottom layer water respectively sucked into the apparatus from the upper intake 8 and the lower intake 9 before discharging form the discharge opening 10, the outer diameter of the flow control disk 73 is made smaller than the maximum outer diameters of the diffusers 71a, 72a (outer diameters of peripheries 71c, 72c).

A pump impeller 74 is attached to a lower end of a rotating shaft 75 which vertically extends through the upper casing 71, the flow control disk 73 and the lower casing 72. An upper end of the rotating shaft 75 is connected to a driving means 76 which is disposed preferably on the float 6. To avoid shaking and deformation of the long rotating shaft 75, the rotating shaft 75 is preferably made into a rigid structure or supported at its intermediate portion by a bearing member 73a formed in the central portion of the flow control disk 73. The float 6 and the mixing/diffusing apparatus 7 are connected to each other by a suitable means (not shown).

Upon rotating the pump impeller 74 by the driving means 76, the bottom layer water 52 is forcedly sucked into the apparatus from the lower intake 9 as shown by arrows. The sucked water moves up in the lower casing and reaches the diffuser 72a, at which the sucked water is changed to flow radially by the flow control disk 73 and then the water is radially discharged at a high speed from the discharge opening 10 in nearly the horizontal direction. The discharged water induces the discharge of the water in the space between the diffuser 71a and the flow control disk 73 from the discharge opening 10 by an ejector effect (a negative pressure generated by a high-speed discharge of water).

When continuing the operation, the bottom layer water 52 is forced to be continuously sucked into the apparatus from the lower intake 9 by the action of rotating pump impeller 74. On the other hand, the ejector effect induces the intake of the surface layer water 51 through the upper intake 8 in the direction indicated by arrows. The sucked surface layer water and the bottom layer water are mixed in the space between the periphery of the diffusers 71a, 72a and the discharge opening 10 to give a mixed water, which is continuously and radially discharged from the discharge opening 10 in nearly the horizontal direction. Since the conical inner surface of the diffuser 71a, 72a tapers toward the discharge opening 10, the surface layer water and the bottom layer water are efficiently mixed with each other before discharged.

The temperature of the mixed water is determined by the temperatures and the mixing ratio of the surface layer water 51 and the bottom layer water 52. By measuring in advance the temperature distribution of the closed water area being purified by the mixing/diffusing apparatus of the present invention, the temperatures of the bottom layer water 52 and the surface layer water 51 can be readily determined. From the temperatures thus determined and the mixing ratio to be employed, the temperature of the mixed water can be readily estimated. Also, from the temperature distribution measured in advance, a water layer having the same temperature as that of the mixed water is suitably selected and the position of discharge opening of the mixing/diffusing apparatus 7 is adjusted so that the mixed water is discharged into the water layer thus selected. The temperature difference between the mixed water and the water layer to which the mixed water is discharged is preferably 1° C. or less.

In this embodiment of the mixing/diffusing apparatus, a driving water (water forcedly sucked) is the bottom layer water 52, and an induced water being sucked by the ejector effect is the surface layer water 51. The driving water may be the surface layer water 51, and the induced water may be the bottom layer water 52. The mixing ratio of the driving water and the induced water is preferably 1:2 to 1:5 by weight, because a high ejector effect is obtained. The sucking rate of the bottom layer water (driving water) is usually 4–100 m³/min although it depends on the rotational number of the pump impeller 74, the inner diameter and the length of the lower casing 72, the cross sectional area of the discharge opening 10, the gap between the diffuser 72a and the flow control disk 73 near the discharge opening 10, etc. The sucking rate of the surface layer water (induced water) depends on the ejector effect due to the discharged bottom layer water, and increases with increasing linear speed of the discharge. For example, when the linear speed of discharging the bottom layer water is increased by narrowing the gap between the diffuser 72a and the flow control disk 73 near the discharge opening 10, the forced sucking amount of the bottom layer water is decreased with a result of increasing the ejector effect, thereby increasing the sucking amount of the surface layer water. In this manner, the mixing ratio can be easily changed in the above range.

As described above, the density current diffusion is most effective to rapidly diffuse the oxygen-deficient water mass (bottom layer water) over a wide range of the closed water area. When the mixed water is discharged into the thermocline having a large temperature gradient or a water layer beneath the thermocline, the density current is stabilized and the laminar density current spreads rapidly over a wide range. When the secondary thermocline with a large temperature gradient is formed on the surface or its vicinity (surface to a depth of 1.5–2 m) in the daytime, the mixed water is discharged preferably into a water layer beneath the secondary thermocline because the density current is diffused effectively. The linear speed of discharging the mixed water is preferably 0.5–3 m/sec.

Since the surface layer water moving toward the upper intake 8 forms a thin laminar density current, the surface layer water is sucked into the apparatus at an extremely high speed and does not disturb the water flow around the upper intake 8. Also, due to the intervening secondary thermocline, the flow of surface layer water and the density current being diffused do not interact to each other to ensure the rapid diffusion of the density current.

The oxygen-deficient water mass is supplied with DO by mixing in the apparatus with the surface layer water containing an oxygen-rich water mass. Also, since the front end of the density current becomes laminar to diffuse horizontally, the density current is further supplied with DO from the oxygen-rich water layer above and below the density current, and the diffusing density current disappears while absorbing heat energy from the surroundings.

Figure 3:
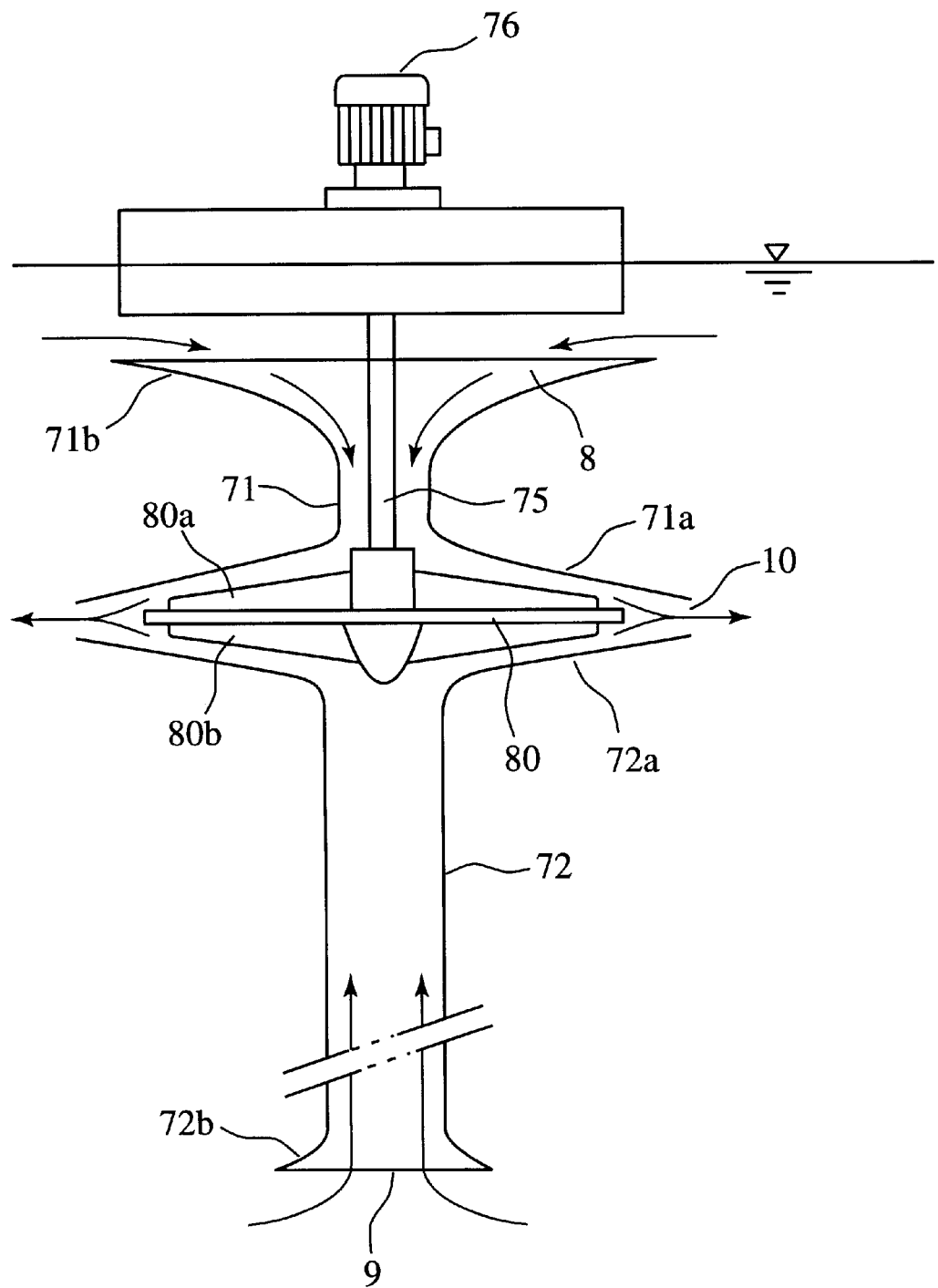
FIG. 3 is a cross sectional view showing another mixing/diffusing apparatus of the present invention.
Figure 4:
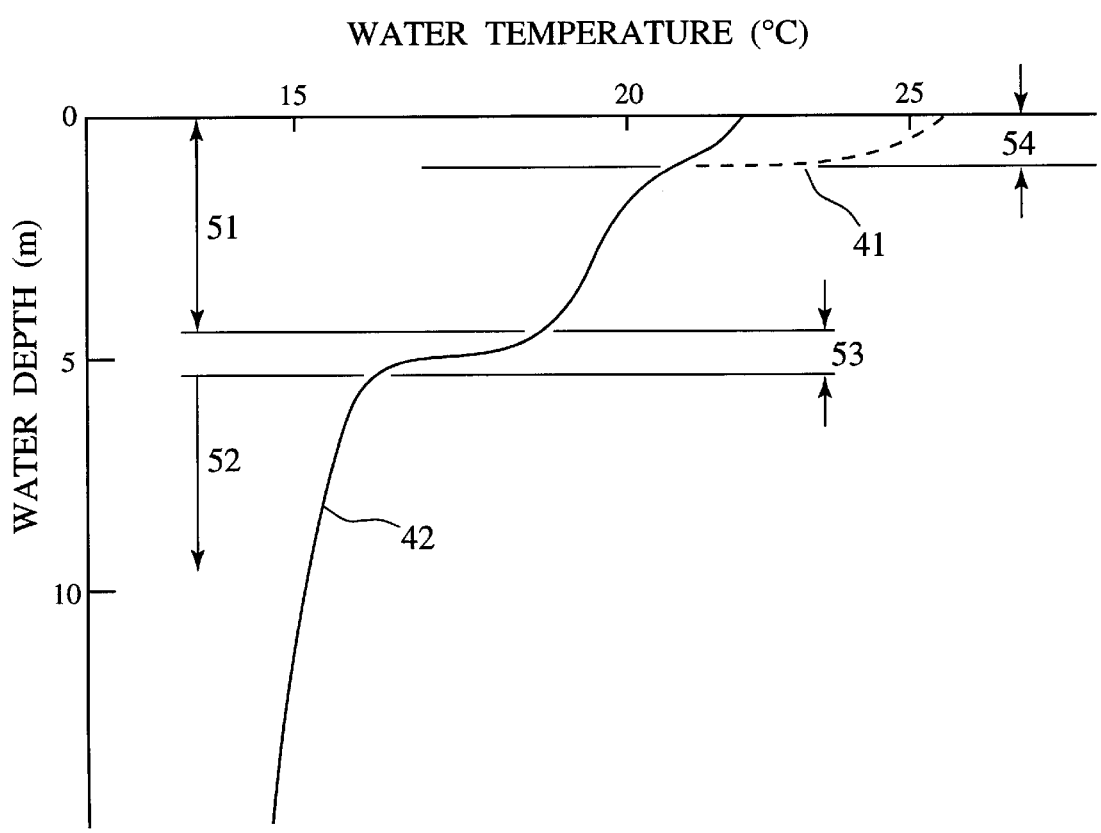
FIG. 4 is an illustrative presentation showing each layer of water constituting a thermal stratification and a temperature distribution in the thermal stratification.
Figure 5A:
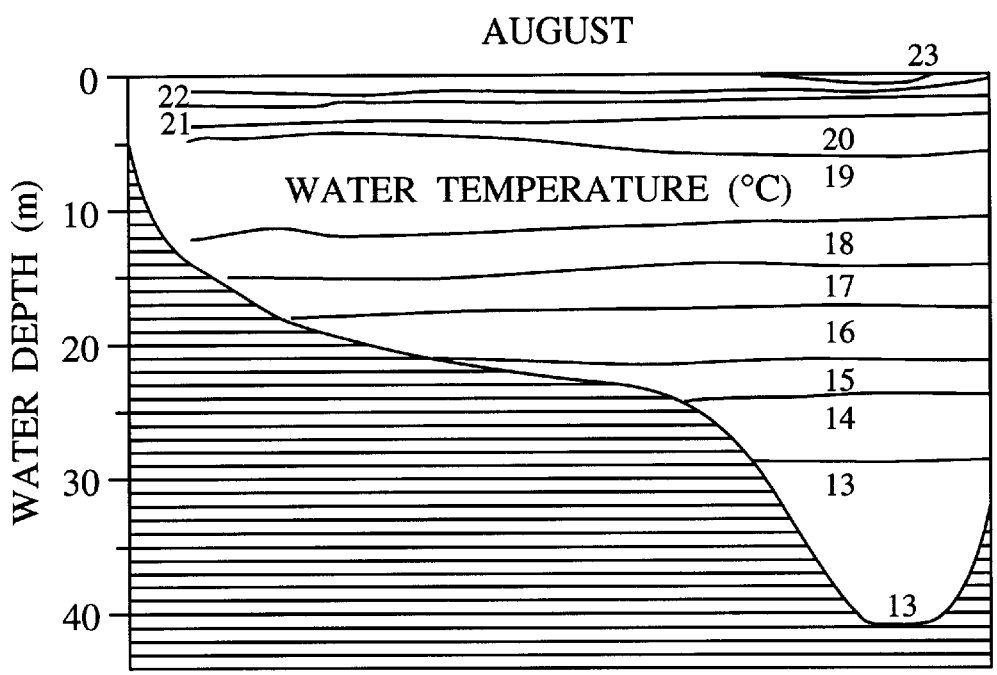
FIGS. 5A and 5B are schematic illustration showing a seasonal change in the water temperature of the thermally stratified water.
Figure 5B:
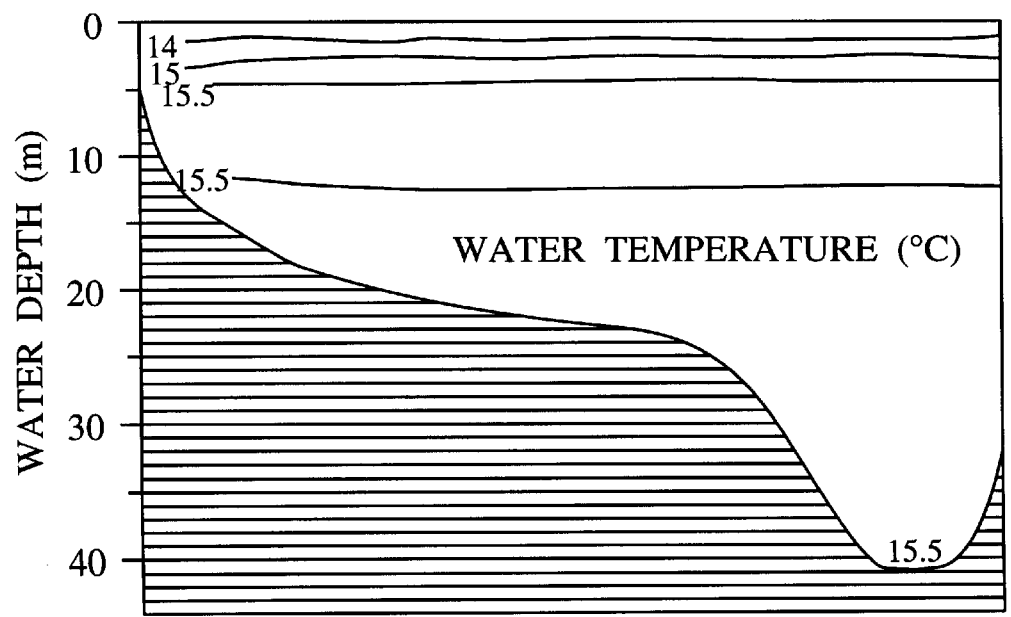
Figure 6A:
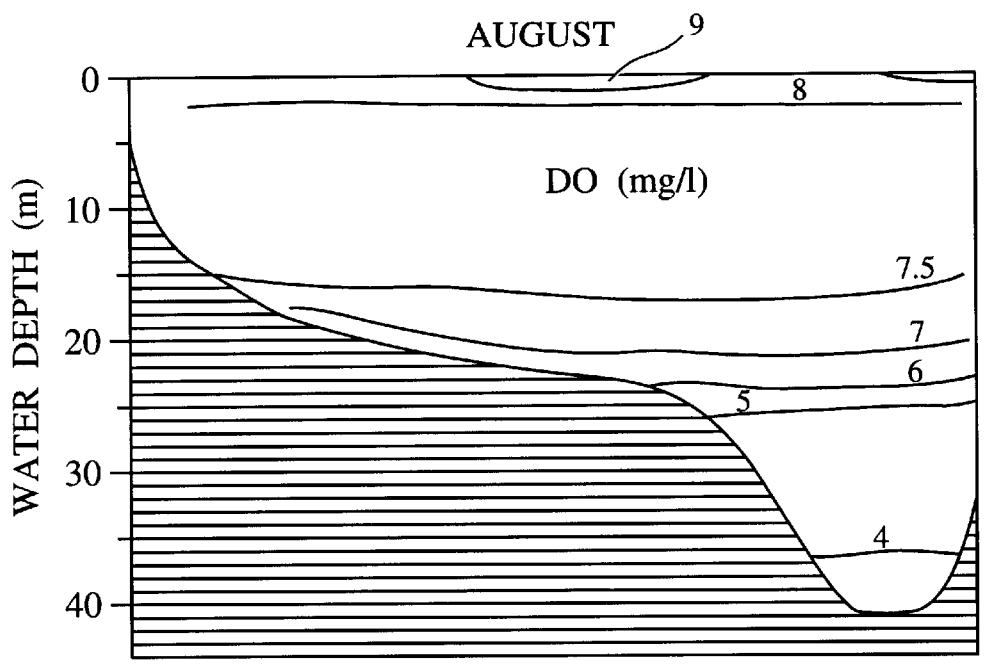
FIGS. 6A and 6B are schematic illustration showing a seasonal change in the DO concentration.
Figure 6B:
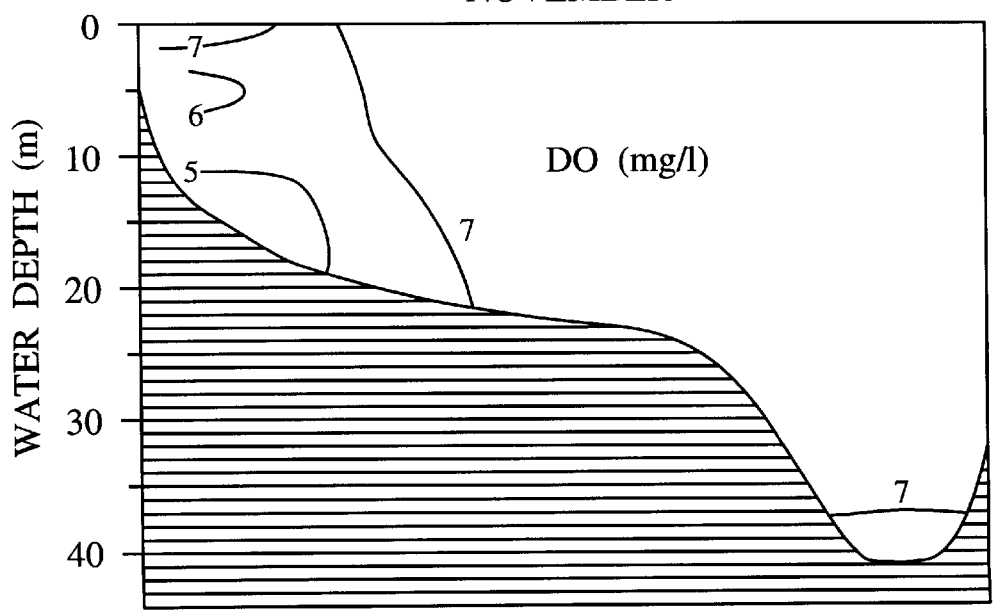
Figure 7:
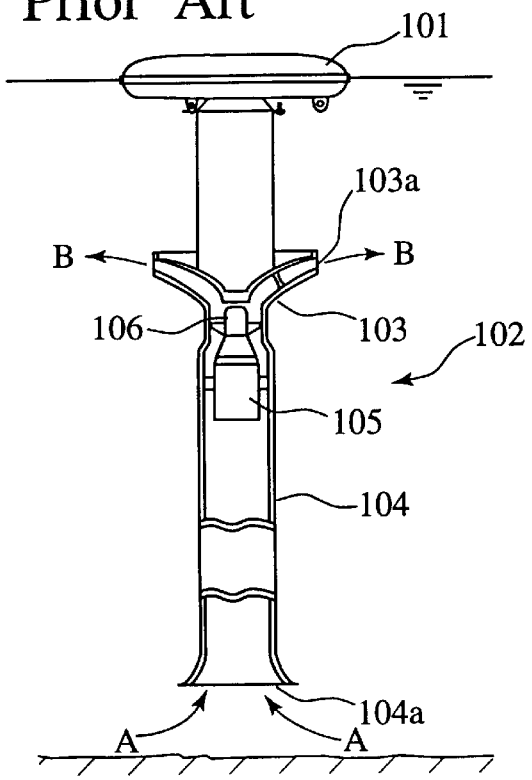
FIG. 7 is a partial cross sectional view showing a conventional agitating aeration apparatus.
Figure 8:
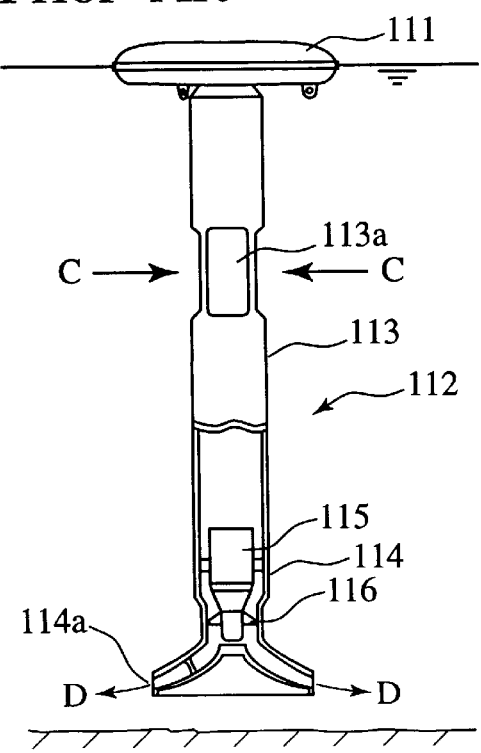
FIG. 8 is a partial cross sectional view showing a another conventional agitating aeration apparatus.
Figure 9:
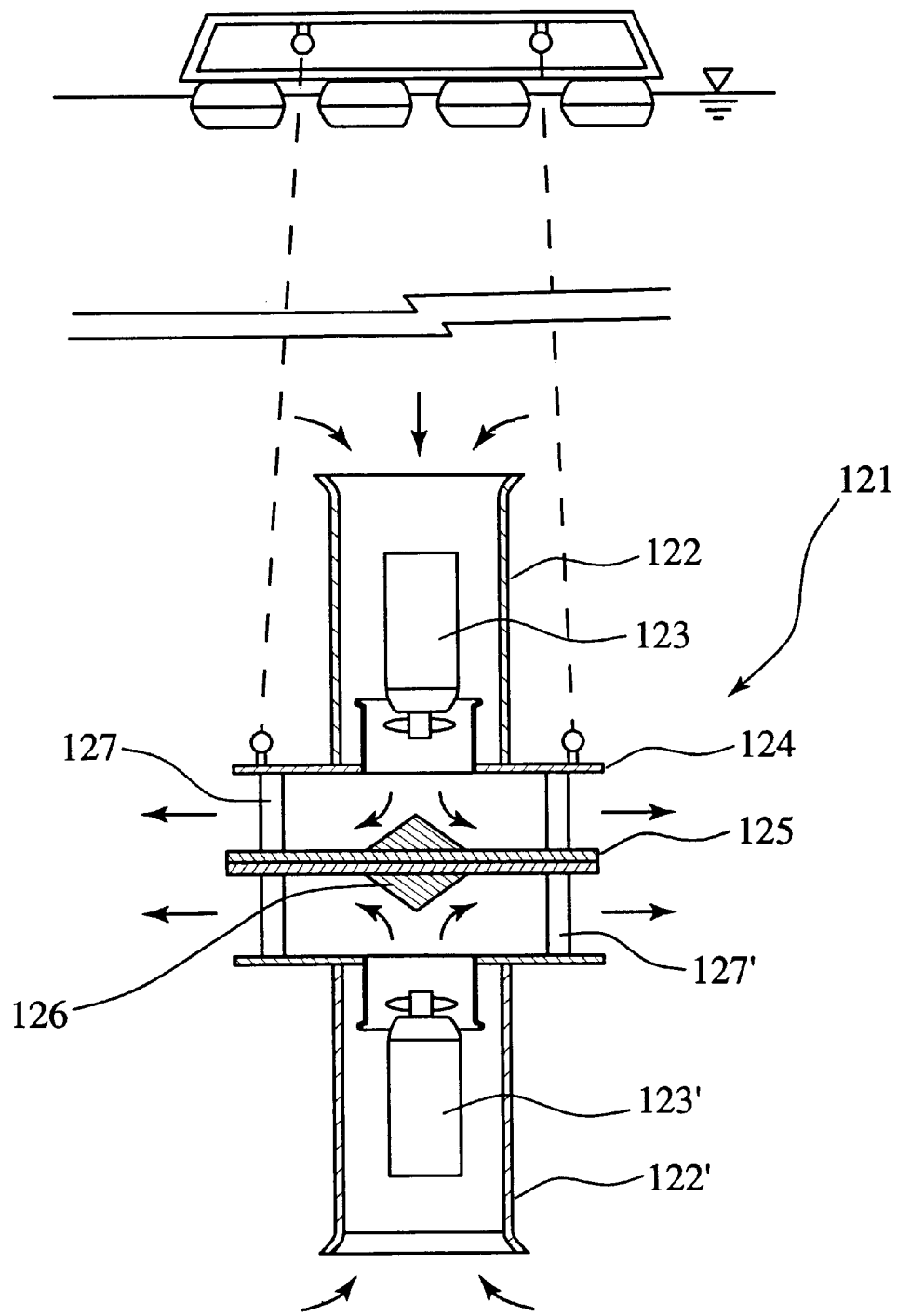
FIG. 9 is a partial cross sectional view showing a still another conventional agitating aeration apparatus.

FIG. 3 is a cross sectional view showing another mixing/diffusing apparatus of the present invention, in which the same parts as in FIG. 2 are referenced by the same reference numerals. As shown in FIG. 3, a rotating disk 80 having an upper blade 80a and a lower blade 80b respectively fixed on the upper surface and lower surface thereof is disposed between diffusers 71a, 72a. The rotating disk 80 is connected to a driving means 76 through a rotating shaft 75. Upon rotating the rotating disk 80 by the driving means 76, the surface layer water and the bottom layer water are forcedly sucked into the apparatus respectively through an upper intake 8 and a lower intake 9.

The intake amount of the bottom layer water is regulated by suitably selecting the height and length in the radial direction of the lower blade 80b, the rotating number of the rotating disk 80, the inner diameter of a lower casing 72, etc. The intake amount of the surface layer water is regulated by suitably selecting the height and length in the radial direction of the upper blade 80a, the rotating number of the rotating disk 80, the inner diameter of an upper casing 71, etc. By suitably controlling the respective intake amounts, a desired mixing ratio of the surface layer water and the bottom layer water can be attained.

The method of the present invention may be applied to the purification of a closed water area having a water depth of about 2–50 m, and the diffusion radius of the mixed water reaches about 1.5 km with the mixing/diffusing apparatus as the center. In some cases, the diffusion radius may reach over 1.5 km. However, since a tracer, usually lithium chloride, disappears due to diffusion, it is difficult to know the exact diffusion radius over 1.5 km.

Since the mixing/diffusing apparatus of the present invention pumps up the water below the surface of water, the output power required for a pump is relatively small for considering the lift of pump. Generally, the output power is determined by taking into account the mixing energy of the surface layer water and the bottom layer water before discharging, loss due to pipes while taking some margin of power.

APPLICABILITY IN INDUSTRY

As described above, the present invention is characterized by sucking the bottom layer water containing the oxygen-deficient water mass and the surface layer water containing the oxygen-rich water mass into the mixing/diffusing apparatus, mixing them before discharging, and discharging the mixed water nearly horizontally into a specific water layer in the stratified water. The temperature of the mixed water is controlled by suitably selecting the mixing ratio of the bottom layer water and the surface layer water. Then, the mixed water thus controlled is radially discharged into a water layer having the same temperature as that of the mixed water in nearly the horizontal direction. By discharging the surface layer water and the bottom layer water after mixing into a water layer having nearly the same temperature, the convection currents of the surface layer water and/or the bottom layer water in the vertical direction can be effectively avoided, and in addition, the mixed water becomes a stable density current to ensure a rapid diffusion of the mixed water over a wide range of the closed water area.

Water areas such as a water basin and a lake basin on a coast and inland are very shallow for its area, since they have a depth/diameter ratio of 1/100 to 1/1000. In such water areas, it is impossible to diffuse the sucked water over a wide area by a known agitating apparatus and agitating aeration apparatus, because the known apparatus causes convection currents. However, according to the method of the present invention, since the mixed water forms the density current to diffuse rapidly over a wide range of the closed water area, the closed water area can be easily and efficiently purified.

When the method of the present invention is practiced in spring (around April in Japan) before the oxygen-deficient water mass is formed, the excessive formation of the oxygen-deficient water mass can be avoided. In autumn (around October in Japan) in which the stratification disappears and the circulating phase begins, the amount of oxygen-deficient water mass is decreased spontaneously. Therefore, the method of the present invention does not have to be practiced in autumn in view of saving energy, when practiced from spring.

It has been known that the oxygen-deficient water mass is concentrated in a depression on the bottom. When the bottom of bay, lake, marsh, etc. is flat, a gentle slope or a depression having a density current gradation is artificially formed on the bottom to generate there the oxygen-deficient water mass. Thereafter, the mixing and diffusion of the surface layer water and the bottom layer water can be effectively done according to the present invention.

The bottom layer water has a low temperature and is rich in nutrient. The present invention promotes the efficient use of the low temperature and nutrient of the bottom layer water.

What is claimed is:

1. A method for purifying a closed water area by mixing and diffusing, which comprises the steps of:

selecting a mixing ratio of a surface water layer and a bottom water layer based on temperature and weight;

sucking said surface water layer and said bottom water layer of said closed water area at the mixing ratio;

mixing said surface water layer and said bottom water layer to prepare a mixed water; and discharging said mixed water into a water layer having a temperature nearly the same as that of said mixed water to form a density current of said mixed water, the discharging step including diffusing the mixed water radially in nearly the horizontal direction through said water layer, said water layer constituting one of stratified layers of said closed water area comprising a plurality of water layers having different temperatures and different densities.

2. The method for purifying a closed water area by mixing and diffusing according to claim 1, wherein said water layer into which said mixed water is discharged is a thermocline layer or a water layer beneath said thermocline layer.

3. The method for purifying a closed water area by mixing and diffusing according to claim 1, wherein said bottom water layer being sucked is a bottom water layer staying in a depression on a bottom of said closed water area.

4. The method for purifying a closed water area by mixing and diffusing according to claim 1, wherein one of said bottom water layer and said surface water layer is forcibly sucked and discharged, and the other of said bottom water layer and said surface water layer is inductively sucked and discharged by an ejector effect due to the discharge of said one of said bottom water layer and said surface water layer.

5. The method for purifying a closed water area by mixing and diffusing according to claim 1, wherein the mixing ratio of said bottom water layer relative to said surface water layer is 1:2 to 1:5.

* * * * *

UNITED STATES PATENT AND TRADEMARK OFFICE
CERTIFICATE OF CORRECTION

PATENT NO.    : 6,428,711 B1 Page 1 of 1
DATED         : August 6, 2002
INVENTOR(S)   : Makoto Nakamura et al.

It is certified that error appears in the above-identified patent and that said Letters Patent is hereby corrected as shown below:

<u>Title page, Item [54] and Column 1, line 2,</u>
"ZONE" should read -- AREA --;

<u>Title page,</u>
Item [73], Assignees, -- MARINO-FORUM21 -- should be added as the first Assignee.

Signed and Sealed this

Twenty-seventh Day of May, 2003

JAMES E. ROGAN
*Director of the United States Patent and Trademark Office*